United States Patent

Fauteux et al.

[11] Patent Number: 5,856,045
[45] Date of Patent: Jan. 5, 1999

[54] LITHIUM ION ELECTROLYTIC CELL AND METHOD FOR FABRICATING SAME

[75] Inventors: Denis G. Fauteux; Jie Shi, both of Acton; Arthur A. Massucco, Natick, all of Mass.

[73] Assignee: Mitsubshi Chemical Corporation, Japan

[21] Appl. No.: 747,778

[22] Filed: Nov. 13, 1996

[51] Int. Cl.$^6$ ................................................ H01M 4/62
[52] U.S. Cl. .......................................... 429/232; 29/623.5
[58] Field of Search ................................. 429/217, 232; 29/623.5

[56] References Cited

U.S. PATENT DOCUMENTS 5,460,904  10/1995  Gozdz et al. .................. 429/217 X
5,474,861  12/1995  Bito et al. ..................... 429/232 X
5,556,721   9/1996  Sasaki et al. .................. 429/232 X
5,587,253  12/1996  Gozdz et al. .................. 429/217 X

OTHER PUBLICATIONS

DuPont Specialty Chemicals Technical Information entitled Lithium Polysilicate Technical consisting of 2 pages. (Date unknown).

*Primary Examiner*—Stephen Kalafut
*Attorney, Agent, or Firm*—Factor and Shaftal

[57] ABSTRACT

The present invention relates to secondary electrolytic cells, and more particularly, to lithium ion electrolytic cells with an inorganic binder and an associated process for fabrication of same. A binder material is mixed with an active material for eventual application onto the surface of a first and/or second electrode. The binder material is soluble with the active material yet insoluble with respect to the associated organic electrolyte.

7 Claims, 2 Drawing Sheets

LITHIUM ION ELECTROLYTIC CELL AND METHOD FOR FABRICATING SAME

BACKGROUND OF THE INVENTION

1. Field of the Invention

The present invention relates in general to secondary electrolytic cells, and more particularly, to lithium ion electrolytic cells with an inorganic binder and a process for fabricating same.

2. Background Art

Lithium ion electrolytic cells (such as lithium ion secondary batteries) have been known in the art for several years. Furthermore, lithium cells which utilize anode and cathode materials binded with organic polymers, such as PVDF, EPDM, and some fluorine-containing copolymers, are similarly well known in the art.

While the use of organic binders is well established in lithium ion cells—they nonetheless have some known limitations in terms of cell/battery performance. Indeed, when organic binders are utilized, physical and/or chemical instability can result due to, for example, solubility of a portion of the binder with the electrolyte—inasmuch as electrolytes used in lithium ion batteries are also made of organic compounds. Accordingly, such solubility can result in premature degradation of the binder (and electrode), and, in turn loss of adhesion of the active material to the associated current collector/electrode.

Additionally, when an organic binder is used to fabricate an electrode and to have it adhere to the current collector, it becomes necessary to use organic solvents—when actually mixing the binder with the active material paste/coating. Accordingly, after applying a coating of the mixed active material/binder to the current collector, and prior to completed fabrication of the cell, any remaining organic solvent must be removed. Failure to do so could result in a substantial loss of cell capacity and diminished cycle life.

It is thus an object of the present invention to provide a lithium ion electrolytic cell having a binder material with excellent physical and chemical stability.

It is further the object of the present invention to provide a unique process for preparing an electrode for use with an inorganic binder.

These and other objects will become apparent in light of the present Specification, Claims and Drawings.

SUMMARY OF THE INVENTION

The present invention is directed to a lithium ion electrolytic cell comprising a first current collector and a second current collector each having a surface. An organic electrolyte is selected from the group comprising liquid, polymer, plastic or gel electrolytes and is used in association with the particular electrodes. At least one of the first and second current collectors has an active material applied to the respective surface. The active material is associated with means for binding the active material to the surface of the respective first or second current collectors. The binder means is not soluble in the active material, nor the organic electrolyte. In addition, the binder means, as well as the active material it is associated with, are mechanically and chemically stable during cycling and storage.

In a preferred embodiment of the invention, the binder means comprises an inorganic compound. This compound can comprise silicic acid, lithium salt, $Li_2Si_5O_{11}$ (also known as lithium polysilicate) as well as any other inorganic compounds which would be known to those with ordinary skill in the art; provided the above-required characteristics of the binder means are met.

In another preferred embodiment of the invention, the binder means is associated with the active material for both the first and second current collector. Of course, it is also contemplated that it only be used in association with one of the first or second current collectors.

The present invention also contemplates a process for fabricating a lithium ion electrolytic cell comprising the steps of a) mixing a binder material with an active material for application onto a surface of at least one of a first and second current collectors, wherein the binder material is insoluble in the active material and insoluble in an associated organic electrolyte, and wherein the binder material is mechanically and chemically stable during cell cycling and storage; b) applying the mixed binder material and active material on the surface of at least one of the first and second current collectors; and c) associating an organic electrolyte selected from the group comprising liquid, polymer, plastic or gel electrolytes, with the first and second current collector.

In a preferred embodiment of the process, the step of mixing comprises mixing an inorganic binder aqueous solution with the particular active material.

In another preferred embodiment, the invention contemplates a chemical process associated with the fabrication of a lithium ion electrolytic cell comprising the steps of a) mixing a binder material with an active material for application onto a surface of at least one of a first and second current collector; b) chemically bonding the binder material with the active material; c) chemically adhering the bonded binder material and active material to the surface of the respective first and second current collector; d) associating the adhered bonded binder material and active material with an organic electrolyte selected from the group comprising liquid, polymer, plastic or gel electrolytes; and e) precluding solubility of the binder material with the organic electrolyte to, in turn, maintain mechanical and chemical stability of the binder material, and, in turn, maintain the adhered and bonded binder material and active material during cell cycling and storage.

BEST MODE FOR PRACTICING THE INVENTION

Figure 1:
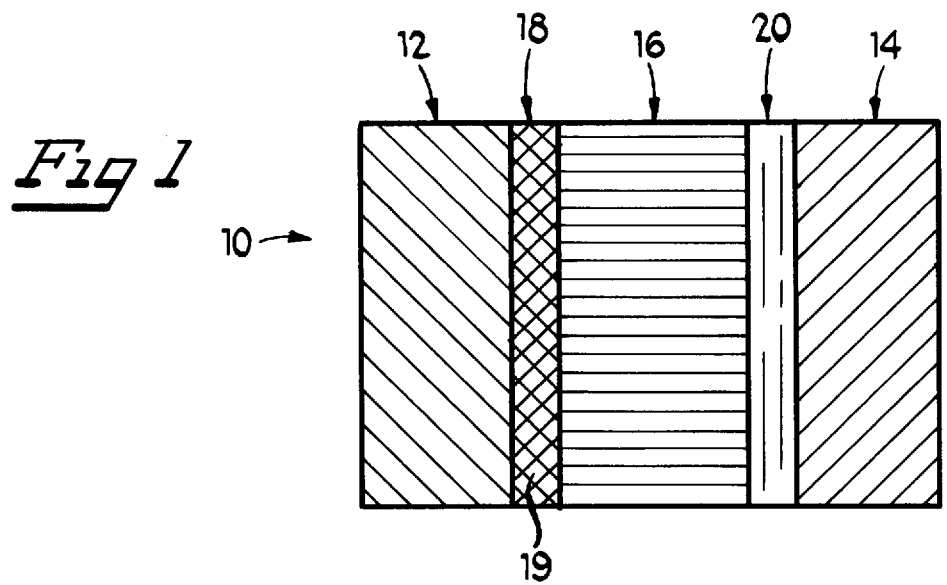
FIG. 1 is a schematic diagram of the present lithium ion electrolytic cell.

While this invention is susceptible of embodiment in many different forms, there is shown in the drawings and will herein be described in detail, one specific embodiment with the understanding that the present disclosure is to be considered as an exemplification of the principles of the invention and is not intended to limit the invention to the embodiment so illustrated.

Electrolytic cell 10 is shown in FIG. 1 as comprising first current collector 12 (anode), second current collector 14 (cathode), and electrolyte 16. Although not shown, the electrolyte can be made of conventional compositions—provided it comprises a liquid, polymer, plastic or gel. The present invention is not intended for use with glass or solid oxide electrolytes.

Current collector 12 is coated with active electrode material 18, which includes an inorganic binder material 19 therein. Although one preferred inorganic binder will be disclosed for use in the present invention, namely lithium polysilicate, it will be understood to those with ordinary skill in the art that other conventional inorganic materials could likewise be used—provided they exhibit the desired adhesion, chemical and physical stability required during cell cycling and storage.

Current collector 14 is also shown in FIG. 1 as being coated with an active material 20—albeit, without an inorganic binder therein. Although the active material of the anode is shown without the use of an inorganic binder, it will be understood to those with ordinary skill in the art (and will be experimentally described) that an inorganic binder is contemplated for mixture with the active material of the cathode, anode, or, both.

As will also be explained hereinbelow, it has been found, through experimentation, that the use of an inorganic binder substantially increases cell performance by maintaining physical and chemical stability within the cell during long term cycling or storage. Indeed, inasmuch as the inorganic binder is insoluble with the organic electrolyte, bonding with the particular active material will occur, to, in turn, provide excellent adhesion of the mixed binder/active material to the particular current collector surface—without the risk of degradation which would otherwise occur if the binder was likewise partially or wholly soluble in the electrolyte.

To substantiate the benefits of utilizing an inorganic binder in a lithium ion electrolytic cell (as well as for disclosing the process of fabricating such a cell), four separate experiments were conducted—three of which utilized inorganic binders and one which did not.

With respect to the first three experiments, a three electrode cell was constructed with the following common characteristics:

1. A graphite anode was prepared as follows: 1.0 g of Lithium Hydroxide (LiOH, Aldrich) was dissolved in 100 g of distilled water. 23.4 g of Lithium Polysilicate (Aldrich, 20% aq. solution) was mixed with the LiOH solution. 45.0 g of graphite powder (Lonza, KS-6) was then added to the solution. 150 g of distilled water was added to the above, and, collectively mixed until a creamy paste developed. After mixing, the paste was coated (with a coating blade) onto copper foil (KISCO)—wherein the foil (current collector) had a thickness of approximately 12 micron. (The actual coating was measured in the range of 30–50 microns after drying). The coated foil was then allowed to dry at ambient room temperature for 1 hour, followed by an additional 2 hour drying cycle within an oven heated at 100° Celsius. After the initial heating stage, the coated foil was further heated at 400° Celsius for 5 minutes, under nitrogen flow, so as to remove any prevalent water from the Lithium Polysilicate. The resultant heat treated anode was then stored under vacuum for future use.

2. A LiCoO$_2$ cathode was prepared as follows: 1.0 g LiOH (Aldrich) was dissolved in 21 g distilled water, to which 24 g Lithium Polysilicate (Aldrich, 20% aq. solution) was added. 1.9 g graphite powder (Lonza, KS-6), 2.9 g C-100 carbon black (Cheveron) and 85.6 g LiCoO$_2$ powder (FMC), followed by 2.0 g Triton® X-100 (Aldrich) were added together and then mixed by stirring until a creamy paste developed. The paste was then coated (with a coating blade) onto Al foil (current collector)—wherein the Al foil had a thickness of approximately 25 μm. The thickness of the coating was measured at approximately 30–70 microns after drying. (The primed Al foil was prepared by coating the suspension of lithium polysilicate and graphite on Al foil. It was then predried at 100° Celsius for 1 hour, and finally treated at 400° Celsius for five minutes. The typical primer layer thickness was 2–4 microns). The coated foil was then allowed to dry at ambient room temperature for one hour, followed by an additional 2 hour drying cycle within an oven heated at 100° Celsius. After the initial heating step, the coated foil was further heated at 400° Celsius for 5 minutes, under nitrogen flow, so as to remove any prevalent water in the lithium polysilicate. The resultant heat treated cathode was then stored under vacuum for future use.

3. A control electrode was prepared as follows: 98.0 g of graphite powder (LONZA KS-6) was added into 100.0 g of a polymer solution made by dissolving 2 g poly (vinylidene fluoride) ("PVDF") in 98 g 1-methyl-2-pyrrolidinone ("NMP") solvent. These components were then mixed together until a creamy paste was formed. The paste was then coated on copper foil—wherein the copper foil had a thickness of approximately 12 micrometers. (The primed copper foil was prepared by coating graphite-lithium polysilicate suspension on the copper foil followed by pre-drying at 100° C. for one hour. Subsequently, the initially heated coating was heated at 400° C. for five minutes under nitrogen flow. The primer layer on the copper foil was measured with a thickness in the range of 2–4 microns). After the coating was complete, NMP solvent was removed under vacuum at approximately 120° C. for approximately 12 hours. The typical thickness of the coating layer was measured at 80–90 μm.

After the above electrodes were fabricated, the following three experiments were conducted:

EXPERIMENT NO. 1

Figure 2:
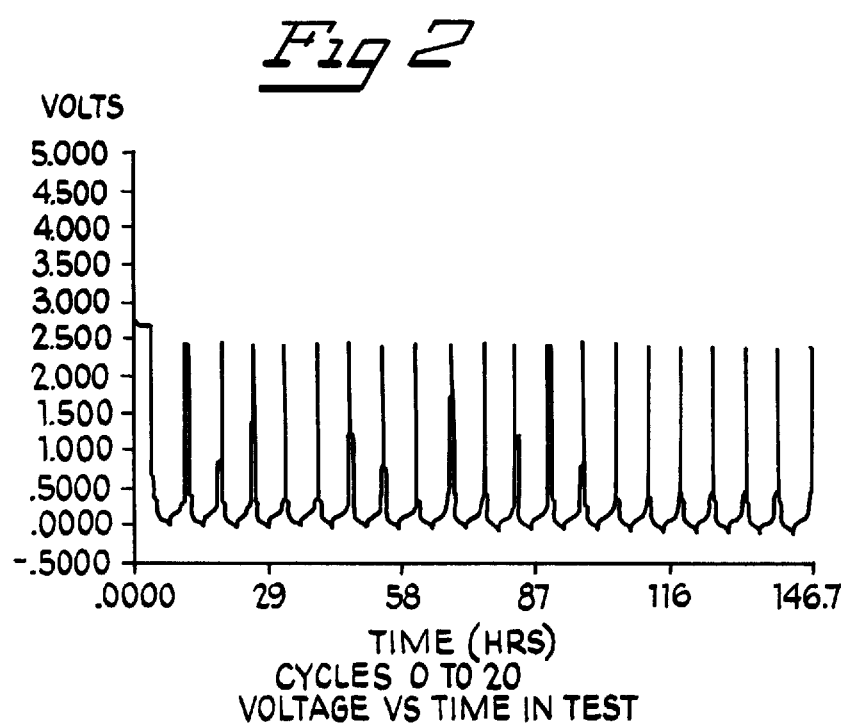
FIG. 2 is a graphical representation of the results of Experiment No. 1 showing, among other things, voltage versus time.

In this experiment, the graphite anode (prepared as identified above, and which included the inorganic lithium polysilicate binder) was evaluated in the three electrode cell constructed as follows: The working electrode (having a coating layer thickness of approximately 43 microns) was cut into 2×2 cm$^2$. Lithium metal (also cut into 2×2 cm$^2$) served as the counter electrode, and a lithium reference electrode (cut into 0.5×0.5 cm$^2$) was sandwiched between the working and counter electrodes. Each of the electrodes were separated by glass fiber separators soaked in an electrolyte solution. As can be seen in FIG. 2, the cell was cycled between 0.005–2.500 V, with charge and discharge currents of 1 mA. When the voltage reached 2.500 V, that voltage was maintained for 20 minutes. Based upon the results of this experiment, the 1st cycle coulombic efficiency was calculated to be approximately 82%.

EXPERIMENT NO. 2

In this experiment, the three electrode cell, as previously described was tested wherein the electrode having the PVDF binder was evaluated. This organic binder had an approximate thickness of 82 micron. As can be seen in FIG. 2, cell cycling conditions were the same as above, except the charge and discharge currents were equal to 2 mA. Based upon the results of this experiment, the 1st cycle coulombic efficiency was calculated to be approximately 65%—substantially lower than the cell of Experiment No. 1 when the inorganic binder was used.

EXPERIMENT NO. 3

Figure 3:
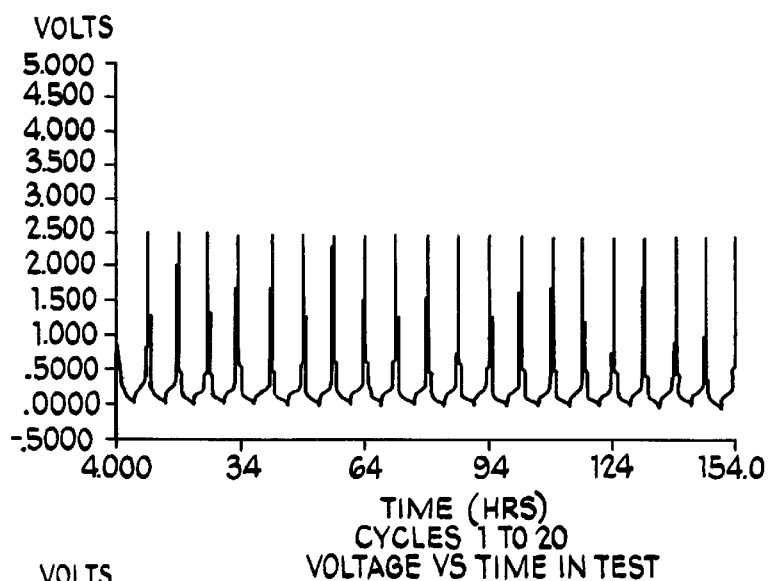
FIG. 3 is a graphical representation of the results of Experiment No. 2 showing, among other things, voltage versus time.

In this experiment, the three electrode cell, as previously described, was again tested—although with the intent of evaluating the $LiCoO_2$ cathode (the working electrode) with the lithium polysilicate binder. The thickness of this inorganic binder was measured at approximately 39 $\mu$m. In this experiment, and as shown in FIG. 3, the three electrode cell was cycled between 3.200–4.200 V with charge and discharge currents of 1 mA. Based upon the results of the experiment, the 1st cycle coulombic efficiency was calculated to be approximately 91%, with subsequent cycles at approximately 100%.

EXPERIMENT NO. 4

Figure 4:
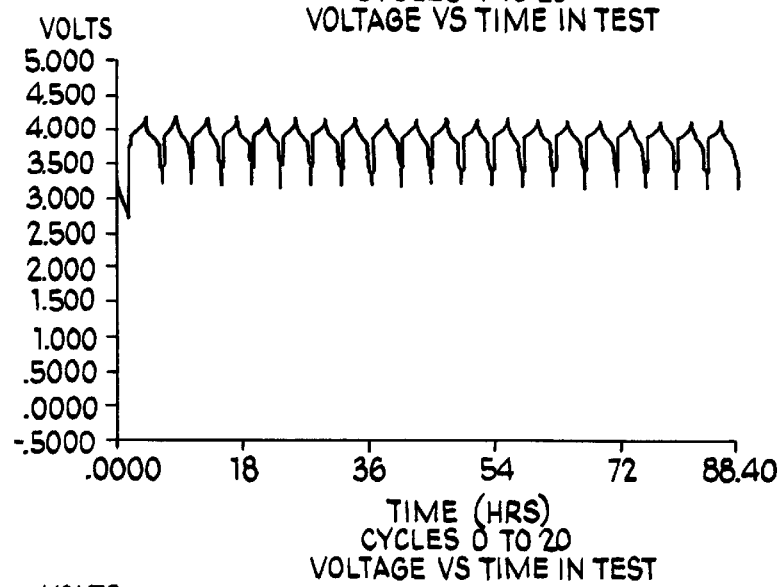
FIG. 4 is a graphical representation of results of Experiment No. 3 showing, among other things, voltage versus time.
Figure 5:
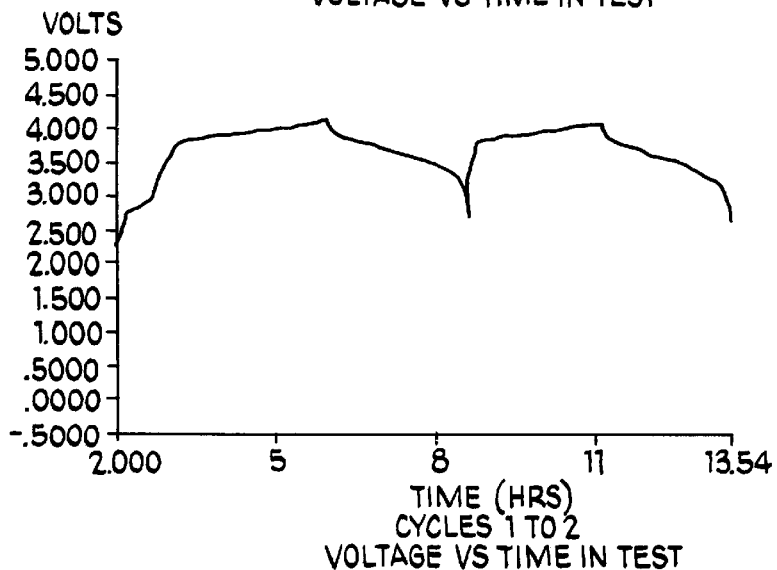
FIG. 5 is a graphical representation of the results of an experiment conducted with a two electrode cell utilizing the inorganic binder of the present invention showing, among other things, voltage versus time.

In this experiment, a two (as opposed to three) electrode cell was fabricated using the $LiCoO_2$ cathode with the lithium polysilicate binder, and, the graphite anode—also with the lithium polysilicate binder. The cell further utilized an organic electrolyte comprising 1M $LiAsF_6$ solution of ethylene carbonate and dimethyl carbonate (3:2 by weight). The cell was cycled between 2.700–4.150 V with charge and discharge currents of 1 mA. As can be seen in FIG. 4, charge and discharge times were extremely close; thereby further substantiating increased coulombic efficiency when an inorganic binder is used.

The foregoing description merely explains and illustrates the invention and the invention is not limited thereto, except insofar as the appended Claims are so limited as those skilled in the art who have the disclosure before them will be able to make modifications and variations therein without departing from the scope of the invention.

What is claimed is:

1. A lithium ion electrolytic cell comprising:
   a first current collector and a second current collector each having a surface;
   an organic electrolyte selected from the group comprising liquid, polymer, plastic or gel electrolytes; and
   at least one of the first and second current collectors having an active material applied to the respective surface,
   the active material being associated with means for binding the active material to the surface of the respective first or second current collector, wherein the binder means comprises an inorganic compound,
   the inorganic binder means being insoluble with at least the organic electrolyte, as well as being mechanically and chemically stable during cell cycling and storage.

2. The lithium ion electrolytic cell according to claim 1 wherein the binder means includes a lithium salt of silicic acid.

3. The lithium ion electrolytic cell according to claim 1 wherein the binder means comprises $Li_2Si_5O_{11}$.

4. The lithium ion electrolytic cell according to claim 1 wherein the binder means is associated with the active material for the first and second current collector.

5. The lithium ion electrolytic cell according to claim 1 wherein the second current collector comprises an anode constructed with graphite/carbon.

6. A process for fabricating a lithium ion electrolytic cell comprising the steps of:
   mixing an inorganic binder material with an active material for application onto a surface of at least one of a first and second current collector, wherein the inorganic binder material is insoluble in at least the organic electrolyte and wherein the inorganic binder material is mechanically and chemically stable during cell cycling and storage;
   applying the mixed inorganic binder material and active material on the surface of at least one of the first and second current collectors; and
   associating an organic electrolyte selected from the group comprising liquid, polymer, plastic or gel electrolytes, with the first and second current collector.

7. The process of claim 6 wherein the step of mixing comprises mixing an inorganic binder aqueous solution with the particular active material.

* * * * *